US012298680B2

(12) United States Patent
Takiguchi et al.

(10) Patent No.: US 12,298,680 B2
(45) Date of Patent: May 13, 2025

(54) DEVELOPER CONTAINER AND IMAGE FORMING APPARATUS

(71) Applicant: FUJIFILM Business Innovation Corp., Tokyo (JP)

(72) Inventors: Toshio Takiguchi, Kanagawa (JP); Yosuke Shimomoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/447,452

(22) Filed: Aug. 10, 2023

(65) Prior Publication Data

US 2023/0384712 A1 Nov. 30, 2023

Related U.S. Application Data

(63) Continuation of application No. PCT/JP2021/034100, filed on Sep. 16, 2021.

(30) Foreign Application Priority Data

Mar. 26, 2021 (JP) ................................ 2021-054093

(51) Int. Cl.
*G03G 15/08* (2006.01)

(52) U.S. Cl.
CPC ..... *G03G 15/0875* (2013.01); *G03G 15/0844* (2013.01); *G03G 2215/068* (2013.01)

(58) Field of Classification Search
CPC ........... G03G 15/0844; G03G 15/0875; G03G 21/1814; G03G 21/1821; G03G 21/1825; G03G 2221/1884
See application file for complete search history.

(56) References Cited

U.S. PATENT DOCUMENTS

D743,400 S 11/2015 Takahashi et al.
D757,161 S 5/2016 Takahashi et al.
(Continued)

FOREIGN PATENT DOCUMENTS

JP 2007-047720 A 2/2007
JP 2011-232399 A 11/2011
(Continued)

OTHER PUBLICATIONS

Oct. 26, 2021 International Search Report issued in International Patent Application No. PCT/JP2021/034100.
(Continued)

*Primary Examiner* — Hoang X Ngo
(74) *Attorney, Agent, or Firm* — Oliff PLC

(57) ABSTRACT

A developer container includes: a containing unit that contains developer; a transport unit that transports the developer; and a receiving unit that receives a driving force transmitted from a transmitting unit of a body of an image forming apparatus and transmits the driving force to the transport unit. The developer container is removably attachable to the body of the image forming apparatus. The developer container includes a first rotation stopping portion and a second rotation stopping portion that is farther from the receiving unit than the first rotation stopping portion. When the developer container is attached to the body of the image forming apparatus, the first rotation stopping portion comes into contact with a first rotation stopper portion provided on the body of the image forming apparatus, and the second rotation stopping portion comes into contact with a second rotation stopper portion provided on the body of the image forming apparatus. A spatial allowance between the first rotation stopping portion and the first rotation stopper portion is less than a spatial allowance between the second
(Continued)

rotation stopping portion and the second rotation stopper portion.

20 Claims, 9 Drawing Sheets

(56) References Cited

U.S. PATENT DOCUMENTS

| | | | |
|---|---|---|---|
| D758,482 | S | 6/2016 | Takahashi et al. |
| 2011/0262188 | A1 | 10/2011 | Awano |
| 2012/0200871 | A1 | 8/2012 | Takahashi et al. |
| 2013/0188985 | A1 | 7/2013 | Takahashi et al. |
| 2013/0223877 | A1 | 8/2013 | Takahashi et al. |
| 2014/0037325 | A1 | 2/2014 | Takahashi et al. |
| 2014/0286670 | A1 | 9/2014 | Takahashi et al. |
| 2014/0314443 | A1 | 10/2014 | Takahashi et al. |
| 2014/0321885 | A1 | 10/2014 | Fujimori et al. |
| 2014/0341602 | A1 | 11/2014 | Takahashi et al. |
| 2015/0293485 | A1 | 10/2015 | Takahashi et al. |
| 2017/0003627 | A1 | 1/2017 | Inada |
| 2017/0153572 | A1 | 6/2017 | Takahashi et al. |
| 2017/0357181 | A1 | 12/2017 | Sue |
| 2018/0253028 | A1 | 9/2018 | Takahashi et al. |
| 2020/0026220 | A1 | 1/2020 | Takahashi et al. |
| 2020/0348615 | A1 | 11/2020 | Takahashi et al. |
| 2021/0088933 | A1 | 3/2021 | Takahashi et al. |
| 2021/0356884 | A1 | 11/2021 | Takahashi et al. |
| 2022/0357684 | A1 | 11/2022 | Takahashi et al. |

FOREIGN PATENT DOCUMENTS

| | | | |
|---|---|---|---|
| JP | 2016-012144 | A | 1/2016 |
| JP | 2017-015896 | A | 1/2017 |
| JP | 2018-180558 | A | 11/2018 |

OTHER PUBLICATIONS

Oct. 26, 2021 Written Opinion issued in International Patent Application No. PCT/JP2021/034100.

Mar. 20, 2025 Extended European Search Report issued in European Patent Application No. 21933193.1.

DEVELOPER CONTAINER AND IMAGE FORMING APPARATUS

CROSS-REFERENCE TO RELATED APPLICATIONS

This is a continuation of International Application No. PCT/JP2021/034100 filed on Sep. 16, 2021, and claims priority from Japanese Patent Application No. 2021-054093 filed on Mar. 26, 2021.

BACKGROUND

(i) Technical Field

The present disclosure relates to a developer container and an image forming apparatus.

(ii) Related Art

Japanese Unexamined Patent Application Publication No. 2011-232399 (hereinafter referred to as Patent Document 1, see to and FIGS. 1 to 5) describes a technology related to a developer container, such as a toner cartridge or a waste toner box, that is removably attachable to an image forming apparatus.

Patent Document 1 describes a toner cartridge including a toner containing chamber in an upper region and a toner discharge chamber in a lower region. The toner cartridge according to Patent Document 1 also includes a toner delivery chamber at a lower end of the toner containing chamber in a central region of the toner cartridge in an up-down direction, and a stirring-and-transporting member delivers toner from the toner delivery chamber to a developing unit. The stirring-and-transporting member is provided with a gear exposed to the outside at an end of the stirring-and-transporting member in an axial direction, and the gear meshes with an upper end portion of a gear of an apparatus body when the toner cartridge is attached to the apparatus body. Thus, in the structure according to Patent Document 1, a driving force from the apparatus body is transmitted through the gear disposed in the central region of the toner cartridge in the up-down direction.

SUMMARY

Aspects of non-limiting embodiments of the present disclosure relate to a developer container removably attachable to an image forming apparatus. Assuming that a driving force is transmitted to the developer container, rattling caused in response to the driving force transmitted to the developer container is reduced compared to when the developer container is positioned at plural locations such that spatial allowances between positioning and positioned portions are equal to each other or when the spatial allowance between the positioning and positioned portions at a location distant from a driving position is relatively small.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a developer container including: a containing unit that contains developer; a transport unit that transports the developer; and a receiving unit that receives a driving force transmitted from a transmitting unit of a body of an image forming apparatus and transmits the driving force to the transport unit, wherein the developer container is removably attachable to the body of the image forming apparatus; wherein the developer container includes a first rotation stopping portion and a second rotation stopping portion that is farther from the receiving unit than the first rotation stopping portion; wherein when the developer container is attached to the body of the image forming apparatus, the first rotation stopping portion comes into contact with a first rotation stopper portion provided on the body of the image forming apparatus, and the second rotation stopping portion comes into contact with a second rotation stopper portion provided on the body of the image forming apparatus; and wherein a spatial allowance between the first rotation stopping portion and the first rotation stopper portion is less than a spatial allowance between the second rotation stopping portion and the second rotation stopper portion.

BRIEF DESCRIPTION OF THE DRAWINGS

An exemplary embodiment of the present disclosure will be described in detail based on the following figures, wherein.

DETAILED DESCRIPTION

Figure 1:
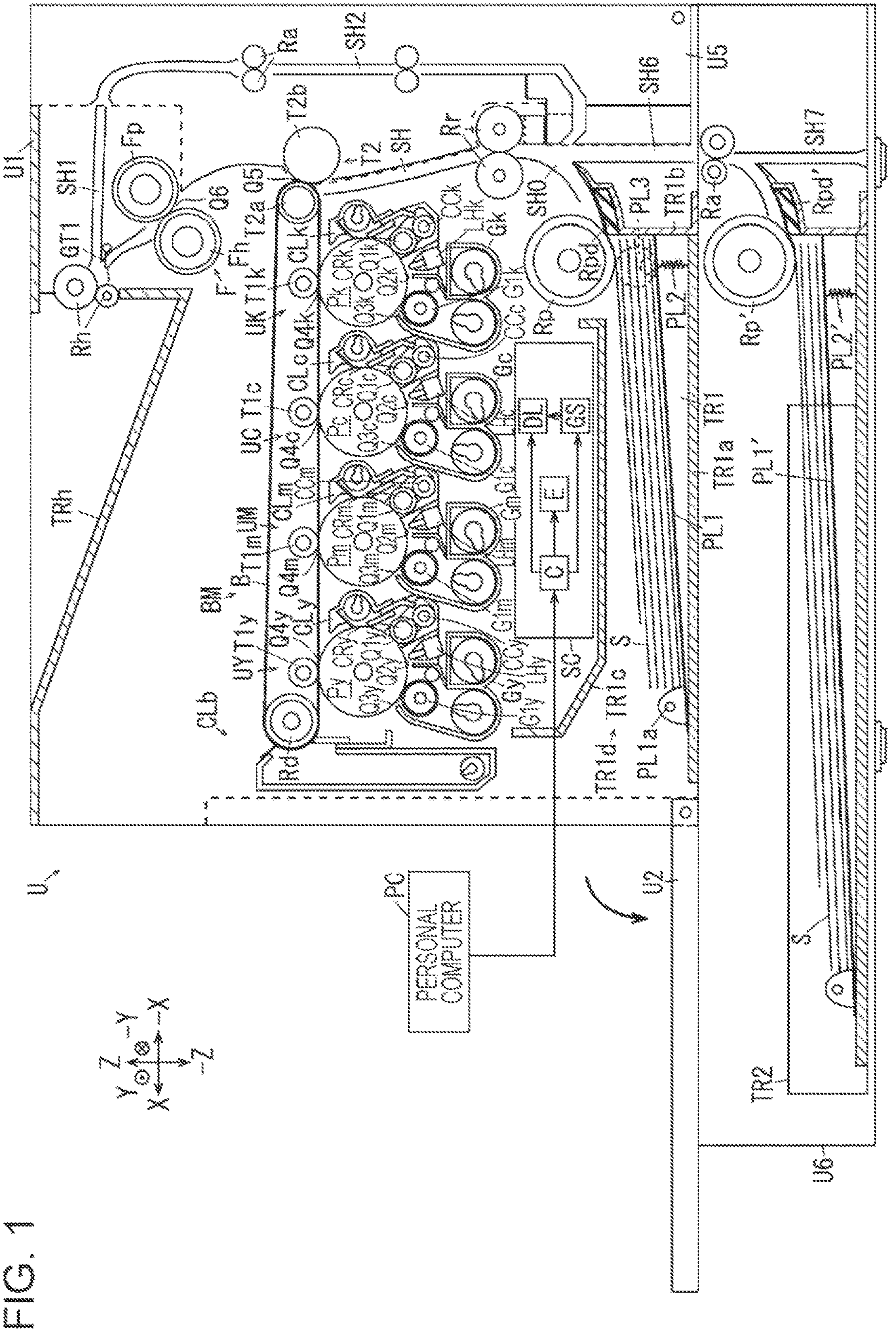
FIG. 1 illustrates an image forming apparatus according to an exemplary embodiment of the present disclosure.

While an exemplary embodiment will now be described with reference to the drawings as a specific example of the present disclosure, the present disclosure is not limited to the exemplary embodiment described below.

To facilitate understanding of the following description, in the drawings, the front-back direction (medium transporting direction), the left-right direction (medium width direction), and the up-down direction are defined as the X-axis direction, the Y-axis direction, and the Z-axis direction, respectively. In addition, the directions shown by arrows X, −X, Y, −Y, Z, and −Z are defined as forward, backward, rightward, leftward, upward, and downward, respectively, and sides in those directions are defined as the front side, the back side, the right side, the left side, the top side, and the bottom side, respectively.

In addition, in the drawings, a circle with a dot in the middle represents an arrow coming out of the page, and a circle with an X in the middle represents an arrow going into the page.

In the drawings, components other than those to be described with reference to the drawings are omitted as appropriate to facilitate understanding.

Exemplary Embodiment

FIG. 1 illustrates an image forming apparatus according to an exemplary embodiment of the present disclosure.

Referring to FIG. 1, a printer U is an example of an image forming apparatus according to the present disclosure, and includes an apparatus body U1. A front covering U2 is supported on a front surface of the apparatus body U1 such that the front covering U2 is openable and closable pivotally around a lower end thereof. The front covering U2 is an example of an opening-closing portion for supplying a medium and is opened and closed when a new medium is supplied. The front covering U2 is supported such that the front covering U2 is movable between an open position shown by the solid lines in FIG. 1 at which paper sheets, which are examples of media, may be inserted and a closed position shown by the dashed lines in FIG. 1. An output tray TRh, which is an example of an output-sheet-receiving unit, is provided on an upper surface of the apparatus body U1.

Referring to FIG. 1, a control substrate SC is disposed in a lower region of the printer U. Various control circuits, a storage medium, and other components are arranged on the control substrate SC. The control substrate SC includes a controller C that controls various operations in the printer U, and also includes an image processor GS, a writing drive circuit DL, and a power supply circuit E controlled by the controller C. The writing drive circuit DL is an example of a drive circuit for latent-image forming devices, and the power supply circuit E is an example of a power supply device. The power supply circuit E applies voltages to charging rollers CRy to CRk, which are examples of charging units; developing rollers Gly to G1*k*, which are examples of developer carriers, and first transfer rollers T1*y* to T1*k*, which are examples of first transfer units.

The image processor GS receives print information input by, for example, a personal computer PC, which is an example of an image-information transmission device and electrically connected to the apparatus body U1. The image processor GS converts the print information into image information used to form latent images corresponding to images of four colors Y, M, C, and K, which are yellow, magenta, cyan, and black, respectively, and outputs the image information to the writing drive circuit DL at a preset time.

When a document image is a single-color image, that is, a monochrome image, only the image information for black is input to the writing drive circuit DL.

The writing drive circuit DL includes drive circuits (not illustrated) for respective colors Y, M, C, and K, and outputs signals corresponding to the input image information to LED heads LHy, LHm, LHc, and LHk, which are examples of latent-image forming units provided for respective colors, at preset times.

Referring to FIG. 1, image forming devices UY, UM, UC, and UK are disposed above the control substrate SC. The image forming devices UY, UM, UC, and UK are examples of image forming units, and form images (toner images) of respective colors, which are yellow, magenta, cyan, and black. Referring to FIG. 1, the image forming device UK for the black color, that is, the K color, includes a photoconductor Pk as an example of an image carrier. The charging roller CRk, the LED head LHk, a developing device Gk, and a photoconductor cleaner CLk are disposed around the photoconductor Pk. The charging roller CRk charges a surface of the photoconductor Pk. The LED head LHk forms an electrostatic latent image on the surface of the photoconductor Pk. The developing device Gk is an example of a developing unit, and develops the latent image on the surface of the photoconductor Pk. The photoconductor cleaner CLk is an example of a cleaning unit for an image carrier, and removes developer that remains on the surface of the photoconductor Pk.

The image forming devices UY, UM, and UC for the other colors have a structure similar to that of the image forming device UK for the black color.

The surfaces of the photoconductors Py to Pk are uniformly charged by the charging rollers CRy to CRk in charging regions Q1*y*, Q1*m*, Q1*c*, and Q1*k* in which the photoconductors Py to Pk face the charging rollers CRy to CRk, respectively, and then the LED heads LHy to LHk write latent images on the surfaces in latent-image forming regions Q2*y*, Q2*m*, Q2*c*, and Q2*k*. The electrostatic latent images written on the surfaces are developed into toner images in developing regions Q3*y*, Q3*m*, Q3*c*, and Q3*k* in which the photoconductors Py to Pk face the developing devices Gy to Gk, respectively. The developed toner images are transported to first transfer regions Q4*y*, Q4*m*, Q4*c*, and Q4*k* in which the photoconductors Py to Pk are in contact with an intermediate transfer belt B, which is an example of an intermediate transfer body. First transfer rollers T1*y*, T1*m*, T1*c*, and T1*k*, which are examples of first transfer units and disposed behind the intermediate transfer belt B in the first transfer regions Q4*y*, Q4*m*, Q4*c*, and Q4*k*, respectively, receive a first transfer voltage from the power supply circuit E controlled by the controller C at preset times, the first transfer voltage having a polarity opposite to a polarity with which toner is charged.

The toner images on the photoconductors Py to Pk are transferred onto the intermediate transfer belt B by the first transfer rollers T1*y*, T1*m*, T1*c*, and T1*k* in a first transfer process.

After the first transfer process, residues and deposits, such as residual toner and discharge products, on the surfaces of the photoconductors Py, Pm, Pc, and Pk are removed by the photoconductor cleaners CLy, CLm, CLc, and CLk. The cleaned surfaces of the photoconductors Py, Pm, Pc, and Pk are recharged by the charging rollers CRy, CRm, CRc, and CRk.

The charging rollers CRy to CRk are in contact with charging cleaners CCy, CCm, CCc, and CCk, which are examples of cleaning units for charging members. Thus, the charging cleaners CCy to CCk remove residues and the like that have been transferred from the photoconductors Py to Pk to the charging rollers CRy to CRk instead of being removed by the photoconductor cleaners CLy to CLk.

Referring to FIG. 1, a belt module BM, which is an example of an intermediate transfer unit, is disposed above the photoconductors Py to Pk. The belt module BM includes the intermediate transfer belt B, which is an example of an image carrier and an example of an intermediate transfer body. The intermediate transfer belt B is rotatably supported by an intermediate transfer support system composed of a belt driving roller Rd, which is an example of a driving unit; a backup roller T2*a*, which is an example of a driven unit and an example of a second transfer facing unit; and the first transfer rollers T1*y*, T1*m*, T1*c*, and T1*k* arranged to face the photoconductors Py to Pk.

A belt cleaner CLb, which is an example of a cleaning unit for the intermediate transfer body, is disposed in front of the intermediate transfer belt B.

A second transfer roller T2*b*, which is an example of a second transfer unit, is disposed to face a surface of a portion of the intermediate transfer belt B in contact with the backup roller T2*a*. The backup roller T2*a* and the second transfer roller T2*b* constitute a second transfer device T2 according to the exemplary embodiment. A region in which the second transfer roller T2*b* and the intermediate transfer belt B face each other serves as a second transfer region Q5.

A single-color or multicolor toner image composed of images successively transferred onto the intermediate transfer belt B in a superposed manner by the first transfer rollers T1*y*, T1*m*, T1*c*, and T1*k* in the first transfer regions Q4*y*, Q4*m*, Q4*c*, and Q4*k* is transported to the second transfer region Q5.

The first transfer rollers T1*y* to T1*k*, the intermediate transfer belt B, and the second transfer device T2 constitute a transfer device according to the exemplary embodiment as an example of a transfer unit.

A manual feed tray TR1, which is an example of a medium stacking portion, is disposed below the control substrate SC. The manual feed tray TR1 includes a raising-and-lowering plate PL1 as an example of a raising-and-lowering unit. Recording sheets S, which are examples of media, are stackable on an upper surface of the raising-and-lowering plate PL1. During printing, the back end of the raising-and-lowering plate PL1 is raised to raise the back ends of the recording sheets S. A paper feed roller Rp, which is an example of a feeding unit, is disposed at the back of the raising-and-lowering plate PL1. When the raising-and-lowering plate PL1 is moved to a raised portion, the paper feed roller Rp comes into contact with the uppermost one of the stacked recording sheets S. A retard pad Rpd, which is an example of a separating unit, is disposed behind the paper feed roller Rp.

The recording sheets S stacked on the manual feed tray TR1 are fed by the paper feed roller Rp and separated from each other in a region in which the retard pad Rpd and the paper feed roller Rp are in contact with each other, and then each recording sheet S is transported to a manual feed path SH0, which is an example of a medium transport path. The recording sheet S transported to the manual feed path SH0 enters a first paper feed path SH6, which is also an example of a medium transport path. Registration rollers Rr, which are examples of transport units and examples of paper-feed-time adjustment members, are disposed at an upper end of the first paper feed path SH6. The registration rollers Rr feed the recording sheet S into the medium transport path SH toward the second transfer region Q5 at a time corresponding to a time at which the toner image on the intermediate transfer belt B reaches the second transfer region Q5.

The toner image on the intermediate transfer belt B is transferred onto the recording sheet S fed to the second transfer region Q5. After the toner image is transferred in the second transfer region Q5, the belt cleaner CLb cleans the intermediate transfer belt B by removing residues, such as residual toner and discharge products, on the surface of the intermediate transfer belt B.

The recording sheet S to which the toner image has been transferred is transported to a fixing region Q6 of a fixing device F, which is an example of a fixing unit. The fixing device F includes a heating roller Fh, which is an example of a heating unit, and a pressing roller Fp, which is an example of a pressing unit. A region in which the heating roller Fh and the pressing roller Fp are in contact with each other at a preset pressure serves as the fixing region Q6. The unfixed toner image on the surface of the recording sheet S is fixed by heat and pressure when the recording sheet S passes through the fixing region Q6.

The recording sheet S to which the image is fixed is output to the output tray TRh by output rollers Rh, which are examples of medium output units.

An additional connection path SH1 for reversal, which is an example of a transport path, is provided to the right of the output rollers Rh. The additional connection path SH1 branches from the medium transport path SH and extends rightward, and a gate GT1, which is an example of a switching unit, is disposed at a location at which the additional connection path SH1 branches from the medium transport path SH.

The printer U according to the exemplary embodiment includes a reversing unit U5 supported on a back surface of the apparatus body U1. A reversing path SH2, which is an example of a second transport path, is disposed in the reversing unit U5. An upstream end of the reversing path SH2 is connected to a right end of the additional connection path SH1 of the apparatus body U1. A downstream end of the reversing path SH2 is joined to the first paper feed path SH6 at a location upstream of the registration rollers Rr of the apparatus body U1.

Accordingly, when double-sided printing is performed, the recording sheet S having an image recorded on one side thereof is transported along the medium transport path SH until the trailing edge in the transporting direction passes the gate GT1, and then the output rollers Rh are rotated in the reverse direction so that the recording sheet S is transported to the additional connection path SH1 and the reversing path SH2. The recording sheet S is transported by transport rollers Ra, which are examples of transport members and disposed on the reversing path SH2, and fed to the registration rollers Rr again in a reversed state.

In the printer U according to the exemplary embodiment, a paper feed module U6 is disposed below the apparatus body U1. A paper feed tray TR2 is disposed in the paper feed module U6. A second paper feed path SH7, which is an example of a transport path, is provided in a back region of the paper feed module U6. The second paper feed path SH7 extends in the up-down direction. An upper end of the second paper feed path SH7 is connected to a lower end of the first paper feed path SH6.

The paper feed tray TR2 according to the exemplary embodiment has a structure similar to that of the manual feed tray TR1 except that the length thereof in the front-back direction is longer than that of the manual feed tray TR1. Therefore, similarly to the manual feed tray TR1, the paper feed module U6 also includes a paper feed roller Rp', a raising-and-lowering plate PL1', and other components. The recording sheet S fed by the paper feed roller Rp' is transported to the first paper feed path SH6. The second paper feed path SH7 allows passage of the recording sheet S transported from below when the paper feed module U6 has an additional paper feed module U6 disposed therebelow.

Description of Toner Cartridges

Figure 2A:
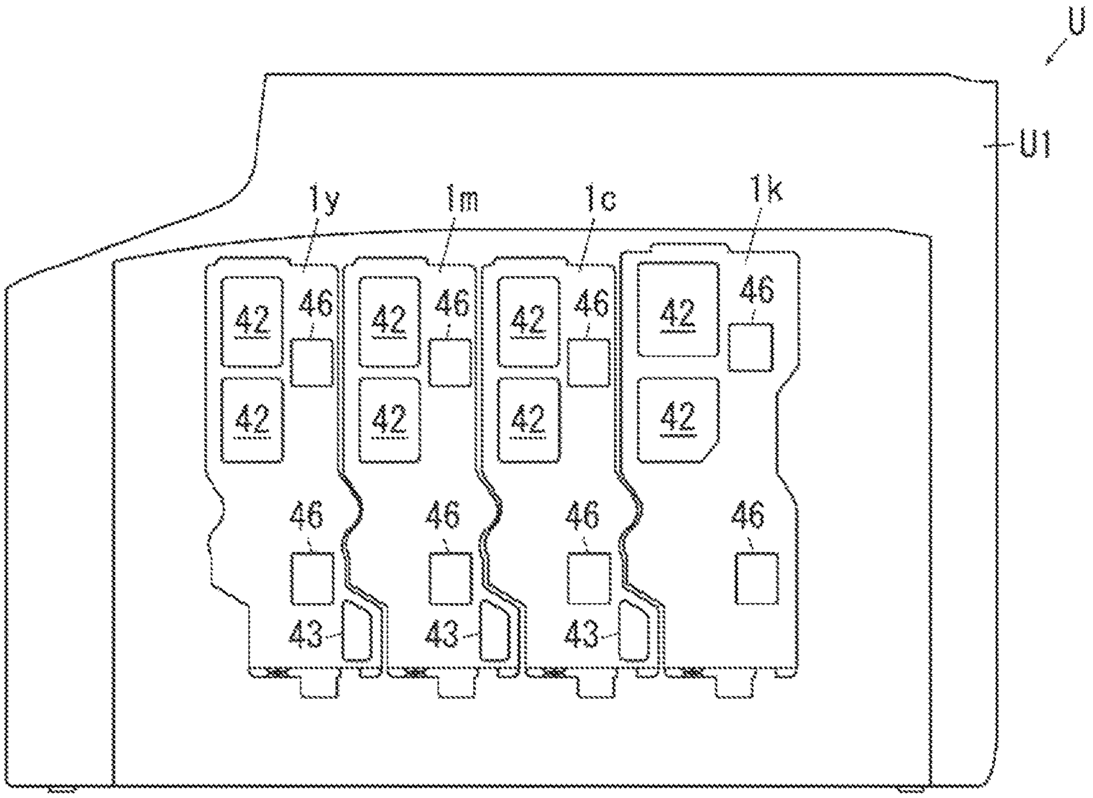
FIG. 2A illustrates a side portion of the image forming apparatus according to the exemplary embodiment to which toner cartridges are attached.
Figure 2B:
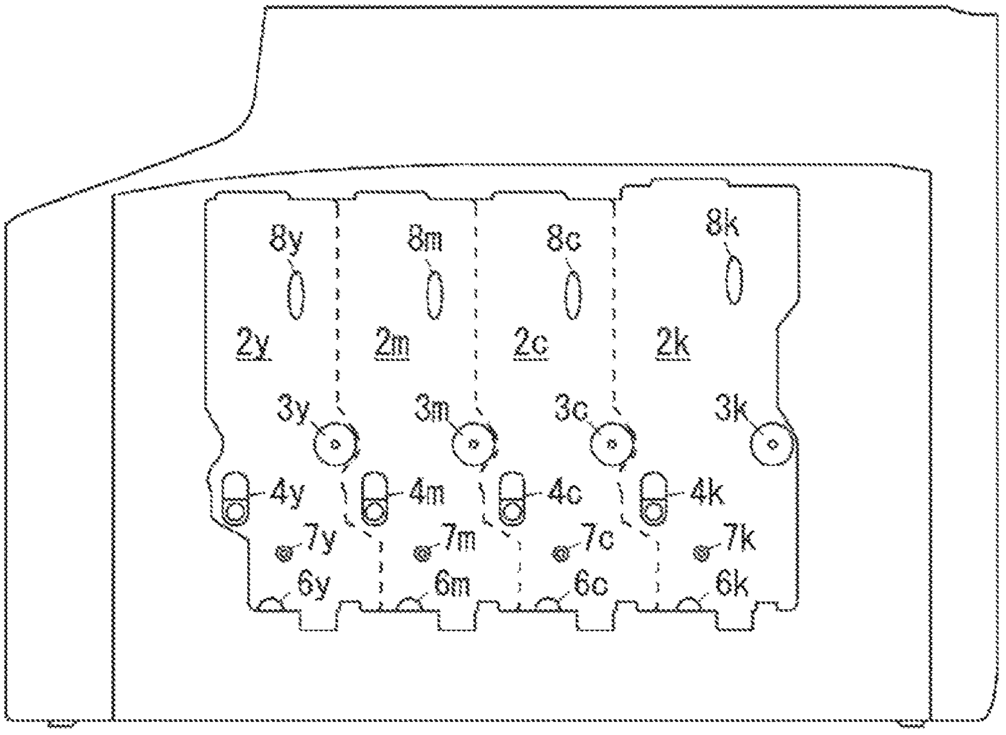
FIG. 2B illustrates the side portion of the image forming apparatus according to the exemplary embodiment from which the toner cartridges are removed.

FIGS. 2A and 2B illustrate a side portion of an image forming apparatus according to the exemplary embodiment. FIG. 2A illustrates a state in which toner cartridges are attached. FIG. 2B illustrates a state in which the toner cartridges are removed.

Referring to FIG. 2A, toner cartridges 1*y*, 1*m*, 1*c*, and 1*k*, which are examples of developer containers, are removably supported on a right side surface of the printer U according to the exemplary embodiment. The toner cartridges 1*y*, 1*m*, 1*c*, and 1*k* are provided for respective colors, which are the Y, M, C, and K colors. The toner cartridges 1*y*, 1*m*, and 1*c* for the Y, M, and C colors have the same size. The toner cartridge 1*k* for the K color, which is frequently used, is larger in size than the toner cartridges 1*y* to 1*c* for the Y, M, and C colors so that a greater amount of toner may be contained.

Referring to FIG. 2B, each of the toner cartridges 1*y* to 1*k* is removably contained in a corresponding one of cartridge receiving chambers 2*y*, 2*m*, 2*c*, and 2*k* formed in a right side surface of the apparatus body U1 of the printer U. Toner discharge tubes 3*y*, 3*m*, 3*c*, and 3*k*, which are examples of developer discharge units and extend from respective ones of the photoconductor cleaners CLy to CLk, are disposed in central regions of the cartridge receiving chambers 2*y*, 2*m*, 2*c*, and 2*k*, respectively, in the up-down direction. The toner discharge tubes 3*y*, 3*m*, 3*c*, and 3*k* project rightward in the cartridge receiving chambers 2*y*, 2*m*, 2*c*, and 2*k*, respectively.

Toner receivers 4*y*, 4*m*, 4*c*, and 4*k*, which are examples of developer receivers, are disposed in front of and below the toner discharge tubes 3*y* to 3*k* in respective ones of the cartridge receiving chambers 2*y* to 2*k*. The toner receivers 4*y* to 4*k* have semicylindrical shapes that project rightward in the cartridge receiving chambers 2*y*, 2*m*, 2*c*, and 2*k* and have openings capable of receiving toner in upper surfaces thereof.

Body gears 6*y*, 6*m*, 6*c*, and 6*k*, which are examples of driving units, are disposed at lower ends of respective ones of the cartridge receiving chambers 2*y* to 2*k*. Each of the body gears 6*y* to 6*k* receives a driving force from a motor (not illustrated), which is an example of a drive source. The body gears 6*y* to 6*k* are disposed such that only upper end portions thereof are exposed to the outside.

Thus, the body gears 6*y* to 6*k* are disposed below the toner cartridges 1*y* to 1*k*, that is, outside the toner cartridges 1*y* to 1*k* in the up-down direction.

Rotation stopper projections 7*y*, 7*m*, 7*c*, and 7*k*, which are examples of first rotation stopper portions, are disposed diagonally above the body gears 6*y* to 6*k*. The rotation stopper projections 7*y* to 7*k* have cylindrical shapes that project rightward in the cartridge receiving chambers 2*y*, 2*m*, 2*c*, and 2*k*.

Rotation stopper recesses 8*y*, 8*m*, 8*c*, and 8*k*, which are examples of second rotation stopper portions, are provided in upper regions of the cartridge receiving chambers 2*y* to 2*k*. The rotation stopper recesses 8*y* to 8*k* are cylindrical recesses that are recessed toward the inner region of the apparatus body U1. The rotation stopper recesses 8*y* to 8*k* according to the exemplary embodiment are formed in the shapes of long holes extending in the up-down direction.

Figure 3:
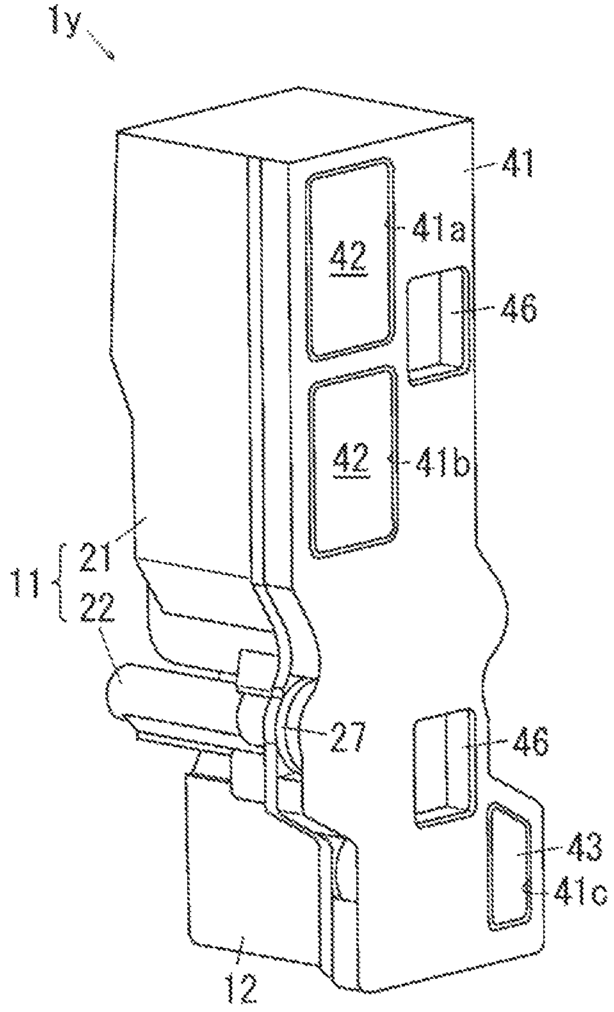
FIG. 3 is a perspective view of a toner cartridge according to the exemplary embodiment viewed diagonally from the front.

FIG. 3 is a perspective view of the toner cartridge according to the exemplary embodiment viewed diagonally from the front.

Figure 4:
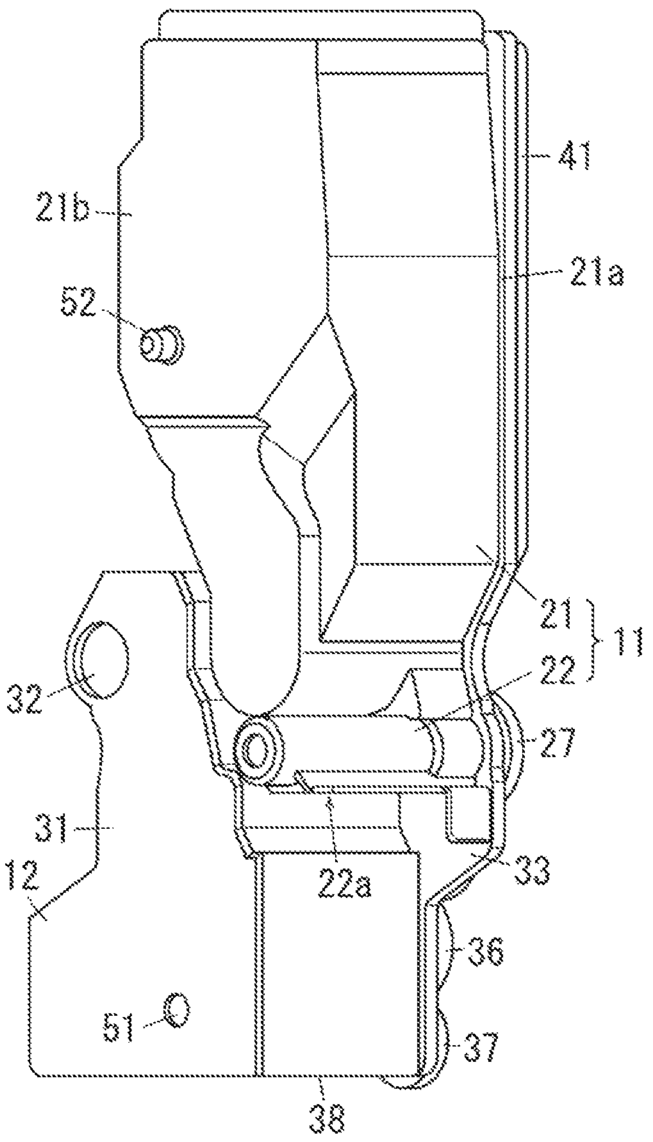
FIG. 4 is a perspective view of the toner cartridge according to the exemplary embodiment viewed diagonally from the back.

FIG. 4 is a perspective view of the toner cartridge according to the exemplary embodiment viewed diagonally from the back.

Figure 5:
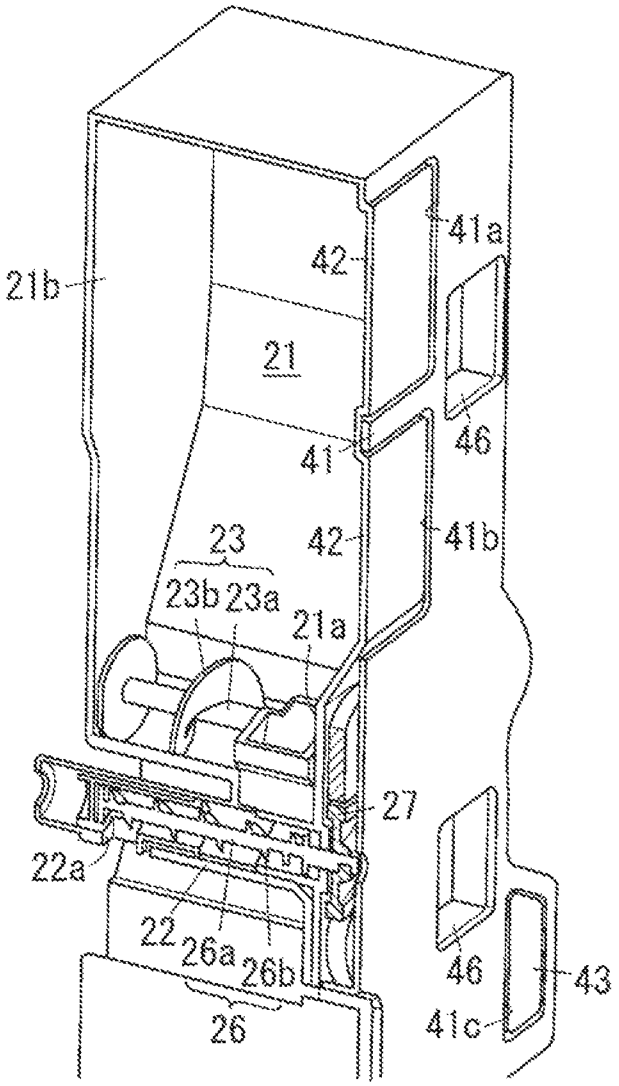
FIG. 5 is a sectional view of a relevant part of the toner cartridge according to the exemplary embodiment.

FIG. 5 is a sectional view of a relevant part of the toner cartridge according to the exemplary embodiment.

Figure 6:
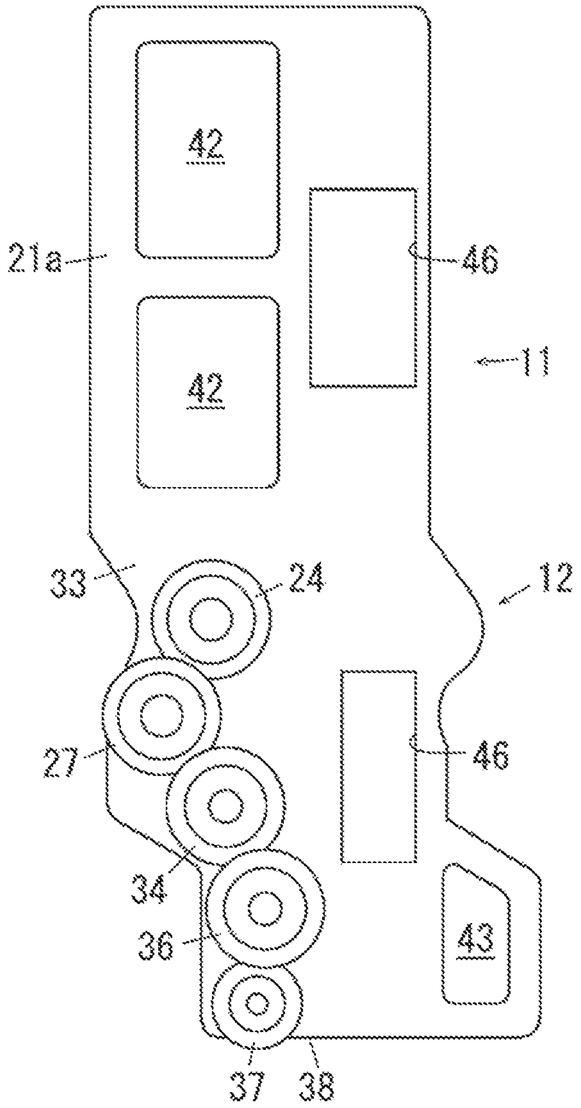
FIG. 6 illustrates the toner cartridge according to the exemplary embodiment from which a protective member is removed.

FIG. 6 illustrates the toner cartridge according to the exemplary embodiment from which a protective member is removed.

The toner cartridges 1*y* to 1*k* will now be described. Since the toner cartridges 1*y* to 1*k* are similar or have similar structures except that the toner cartridges 1*y* to 1*k* have different sizes, only the toner cartridge 1*y* for the Y color will be described in detail, and description of the toner cartridges 1*m*, 1*c*, and 1*k* for the other colors will be omitted.

Referring to FIGS. 3 to 6, the toner cartridge 1 (1*y*) includes a new-toner containing portion 11 in an upper region and a waste-toner containing portion 12 in a lower region. The new-toner containing portion 11 and the waste-toner containing portion 12 constitute a containing unit according to the exemplary embodiment. More specifically, in the exemplary embodiment, an upper end of the new-toner containing portion 11 is disposed above an upper end of the waste-toner containing portion 12. The new-toner containing portion 11, which is an example of a first containing portion, contains new toner, which is new developer to be supplied to the developing device Gy. The waste-toner containing portion 12, which is an example of a second containing portion, receives developer and discharge products collected by the photoconductor cleaner CLy.

The new-toner containing portion 11 includes a containing portion 21 in an upper region and a supply portion 22 in a lower region. Referring to FIG. 5, a stirring auger 23, which is an example of a stirring unit, is disposed at a lower end of the containing portion 21. The stirring auger 23 includes a rotating shaft 23*a* and a helical blade 23*b* supported on an outer periphery of the rotating shaft 23*a*.

An end portion of the rotating shaft 23*a* is rotatably supported by an outer wall 21*a* of the containing portion 21. A stirring gear 24, which is an example of a second receiving unit, is supported by the outer end of the rotating shaft 23*a* at a location outside the outer wall 21*a* of the containing portion 21, that is, in front of the outer wall 21*a* in an attachment/removal direction of the toner cartridge 1*y*. When rotated, the stirring auger 23 according to the exemplary embodiment transports the developer in the containing portion 21 toward the outer wall 21*a* while stirring the developer.

The supply portion 22 has a tubular shape extending parallel to the rotating shaft 23*a*, and is connected to the containing portion 21 at an end of the supply portion 22 adjacent to the outer wall 21*a*. The supply portion 22 has a supply port 22*a* that opens downward at an end of the supply portion 22 adjacent to the inner region of the apparatus body U1. The supply portion 22 is disposed at a position corresponding to the position of the toner receiver 4*y*, and the supply port 22*a* is connected to the opening in the toner receiver 4*y* when the toner cartridge 1*y* is attached to the apparatus body U1.

A transport auger 26, which is an example of a transport unit, is disposed in the supply portion 22. The transport auger 26 includes a rotating shaft 26*a* extending parallel to the rotating shaft 23*a* of the stirring auger 23 and a helical blade 26*b* supported on an outer periphery of the rotating shaft 26*a*. A transport gear 27, which is an example of a third receiving unit, is supported by the outer end of the transport auger 26. The transport gear 27 meshes with the stirring gear 24. When rotated, the transport auger 26 according to the exemplary embodiment transports the developer in the supply portion 22 toward the supply port 22*a* while stifling the developer.

Thus, in the exemplary embodiment, the toner contained in the new-toner containing portion 11 is transported toward the supply port 22*a* while being stirred by the stirring auger 23 and the transport auger 26 disposed at the lower end of the new-toner containing portion 11, and is supplied to the developing device Gy through the toner receiver 4*y* in the apparatus body U1.

Referring to FIG. 4, the waste-toner containing portion 12 has a waste-toner receiving port 32 in an upper end portion of an inner wall 31 adjacent to the inner region of the apparatus body U1, the waste-toner receiving port 32 being an example of an opening through which the developer is introduced into the waste-toner containing portion 12. The waste-toner receiving port 32 is formed at a position corresponding to the position of the toner discharge tube 3*y*, and is disposed above the transport auger 26 in the exemplary embodiment. In the exemplary embodiment, when the toner cartridge 1*y* is attached to the apparatus body U1, the toner discharge tube 3*y* is inserted into the waste-toner receiving port 32, so that the toner discharged from an opening (not illustrated) at an end of the toner discharge tube 3*y* is introduced into and contained in the waste-toner containing portion 12.

The structures for attachment/detachment between the waste-toner receiving port 32 and the toner discharge tube 3*y* and between the supply portion 22 and the toner receiver 4*y* may be, for example, structures disclosed in Patent Document 1.

Referring to FIG. 6, in the exemplary embodiment, a first intermediate gear 34, which is an example of a first intermediate transmitting unit, is disposed diagonally below the transport gear 27 on an outer surface of an outer wall 33 of the waste-toner containing portion 12. The first intermediate gear 34 meshes with the transport gear 27.

A second intermediate gear 36, which is an example of a second intermediate transmitting unit, is disposed diagonally below the first intermediate gear 34. The second intermediate gear 36 meshes with the first intermediate gear 34.

A receiving gear 37, which is an example of a receiving unit, is disposed below the second intermediate gear 36. The receiving gear 37 meshes with the second intermediate gear 36. A lower end portion of the receiving gear 37 according to the exemplary embodiment is exposed at a location below a lower end surface 38 of the toner cartridge 1*y*. Here, the expression “upper end surface or lower end surface” is used to refer to an outermost surface among the upper or lower surfaces of the new-toner containing portion or the waste-toner containing portion of the cartridge. When the toner cartridge 1*y* is attached to the apparatus body U1, the receiving gear 37 meshes with the body gear 6*y*.

Referring to FIGS. 3, 5, and 6, in the exemplary embodiment, an outer covering 41, which is an example of a protective unit, is disposed on the outer side of the gears 24, 27, and 34 to 37 of the toner cartridge 1*y*, that is, in front of the toner cartridge 1*y* in the attachment/removal direction. The outer covering 41 covers the outer sides of the gears 24, 27, and 34 to 37 so that external members do not come into contact with the gears 24, 27, and 34 to 37.

The outer covering 41 according to the exemplary embodiment has plural openings 41*a*, 41*b*, and 41*c*. The new-toner containing portion 11 according to the exemplary embodiment includes protrusions 42 that protrude outward at positions corresponding to the positions of the openings 41*a* and 41*b* in the outer covering 41. The protrusions 42 according to the exemplary embodiment protrude to a position corresponding to the outer end (outer surface) of the outer covering 41 in the attachment/removal direction. Therefore, the volume of the developer containable in the new-toner containing portion 11 may be increased compared to when the protrusions 42 are not provided. The waste-toner containing portion 12 according to the exemplary embodiment includes a protrusion 43 that protrudes outward similarly to the protrusions 42 at a position corresponding to the position of the opening 41*c* in the outer covering 41. Therefore, the volume of the developer containable in the waste-toner containing portion 12 may be increased compared to when the protrusion 43 is not provided.

The toner cartridge 1*y* according to the exemplary embodiment has a pair of upper and lower operation holes 46, which are examples of operation units, in the outer side thereof. An operator intending to replace the toner cartridge 1*y* may insert their thumb and index finger into the upper and lower operation holes 46 to pinch and pull out the toner cartridge 1*y* in the forward direction to remove the toner cartridge 1*y* or push the toner cartridge 1*y* in the backward direction to attach the toner cartridge 1*y*.

Referring to FIG. 4, in the toner cartridge 1 according to the exemplary embodiment, a rotation stopping recess 51, which is an example of a first rotation stopping portion, is formed in a lower portion of the inner wall 31 of the waste-toner containing portion 12. The rotation stopping recess 51 is disposed at a position corresponding to the position of the rotation stopper projection 7*y*, and is composed of a cylindrical recess capable of receiving the rotation stopper projection 7*y*.

A rotation stopping projection 52, which is an example of a second rotation stopping portion, is formed on an inner wall 21*b* of the new-toner containing portion 11. The rotation stopping projection 52 is disposed at a position corresponding to the position of the rotation stopper recess 8*y*. The rotation stopping projection 52 has a cylindrical shape and is formed such that the outer diameter of the rotation stopping projection 52 corresponds to the minor-axis dimension of the rotation stopper recess 8*y* having the shape of a long hole.

In the exemplary embodiment, a “spatial allowance”, that is, a size difference referred to as a “clearance”, a “margin”, or a “play”, is provided between the rotation stopper projection 7*y* and the rotation stopping recess 51 and between the rotation stopper recess 8*y* and the rotation stopping projection 52. Here, the terms such as “spatial allowance” and “play” are used to refer to the size of a space that allows movement of the toner cartridge 1*y* relative to the apparatus body U1 while the toner cartridge 1*y* is in a positioned state. With no “play” at all, the toner cartridge 1*y* cannot be attached or removed when manufacturing errors or assembly errors are large, and the operation efficiency is reduced because the toner cartridge 1*y* cannot be attached without accurate manual positioning by the operator. Therefore, the “play” is always provided. In the exemplary embodiment, the play between the rotation stopper projection 7*y* and the rotation stopping recess 51 is less than the play between the rotation stopper recess 8*y* and the rotation stopping projection 52.

In the exemplary embodiment, the length by which the rotation stopper projection 7*y* projects is greater than the length by which the rotation stopping projection 52 projects. In addition, in the exemplary embodiment, the length (depth) of the rotation stopping recess 51 is greater than the length of the rotation stopping projection 52.

Operation of Exemplary Embodiment

In each of the toner cartridges 1*y* to 1*k* according to the exemplary embodiment having the above-described structure, the transport auger 26 is disposed in a central region in the up-down direction. The driving force for the transport auger 26 is transmitted from the apparatus body U1 through the receiving gear 37 exposed at a location below the lower end surface of the waste-toner containing portion 12.

In the structure of the related art, the driving force is transmitted from the apparatus body U1 at a position of the transport gear 27, and members of the toner cartridge 1*y* cannot be arranged around the supply portion 22 due to the presence of a structure of the apparatus body U1. In other words, according to the structure of the related art, the entirety of a transmitting unit including a rotating shaft and a gear provided in the apparatus body to transmit the driving force to the transport auger is disposed on the inner side of the end surface of the new-toner containing portion or the waste-toner containing portion in the up-down direction. Therefore, due to the installation space for the transmitting unit provided in the apparatus body, it is difficult increase the capacity of the waste-toner containing portion 12 from the structural point of view.

In contrast, in the exemplary embodiment, a portion of the receiving gear 37 that receives the driving force from the apparatus body U1 is disposed below the lower end surface of each of the toner cartridges 1*y* to 1*k*.

In each of the toner cartridges 1*y* to 1*k* according to the exemplary embodiment, the transport auger 26 is disposed at the lower end of the new-toner containing portion 11 and below the upper end of the waste-toner containing portion 12.

In addition, in each of the toner cartridges 1*y* to 1*k* according to the exemplary embodiment, the receiving gear 37 is disposed below the transport auger 26 and below the upper end of the waste-toner containing portion 12. In the exemplary embodiment, the transport auger 26 is disposed below the central region of each of the toner cartridges 1*y* to 1*k* in the up-down direction, and the number of intermediate gears is increased when the receiving gear 37 is disposed at the upper end of each of the toner cartridges 1*y* to 1*k*. In particular, in the exemplary embodiment, each of the toner cartridges 1*y* to 1*k* is long in the up-down direction (has a longitudinal direction in the up-down direction), and the number of intermediate gears is easily increased. In addition, when the receiving gear 37 is disposed at the upper end, the intermediate gears are to be disposed on an outer surface of the new-toner containing portion 11. Therefore, the protrusions 42 on the new-toner containing portion 11 cannot be easily formed, and the capacity of the new-toner containing portion 11 is reduced. In contrast, in the exemplary embodiment, the receiving gear 37 is disposed at the lower end.

In each of the toner cartridges 1*y* to 1*k* according to the exemplary embodiment, the waste-toner receiving port 32 of the waste-toner containing portion 12 is disposed above the transport auger 26.

In addition, in the printer U according to the exemplary embodiment, the body gears 6*y* to 6*k* of the apparatus body U1 are disposed on the outer side of the lower end surfaces of the toner cartridges 1*y* to 1*k*.

In each of the toner cartridges 1*y* to 1*k* according to the exemplary embodiment, the outer covering 41 is provided.

In addition, in each of the toner cartridges 1*y* to 1*k* according to the exemplary embodiment, the protrusions 42 and 43 are formed at positions corresponding to the positions of the openings 41*a* to 41*c* in the outer covering 41.

Figure 7A:
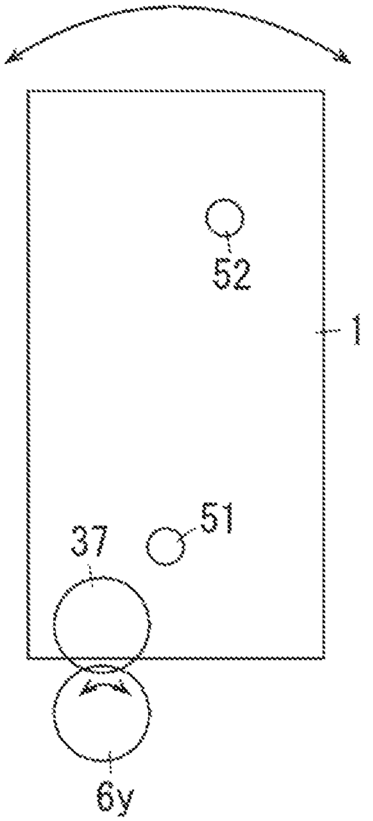
FIG. 7A is a diagram used to describe an operation according to the exemplary embodiment and illustrating a rotation of the toner cartridge in a rotation direction of a gear.
Figure 7B:
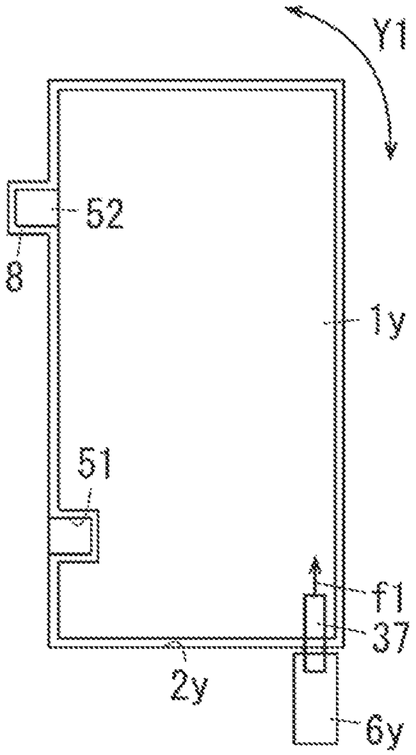
FIG. 7B is a diagram used to describe an operation according to the exemplary embodiment and illustrating a rotation due to a reaction force in a radial direction of the gear.

FIGS. 7A and 7B are diagrams used to describe the operation according to the exemplary embodiment, wherein FIG. 7A illustrates a rotation of the toner cartridge in a rotation direction of a gear, and FIG. 7B illustrates a rotation due to a reaction force in a radial direction of the gear.

Referring to FIG. 7A, in each of the toner cartridges 1*y* to 1*k* according to the exemplary embodiment, when viewed in the attachment/removal direction (as in FIGS. 2A, 2B, 6, and 7A), the rotation stopping recess 51 is disposed at a position close to the receiving gear 37, and the rotation stopping projection 52 is disposed at a position distant from the receiving gear 37. When the driving force is transmitted to the receiving gear 37 from each of the body gears 6*y* to 6*k*, the entirety of each of the toner cartridges 1*y* to 1*k* receives a rotating force in a rotation direction around the corresponding one of the body gears 6*y* to 6*k*. Therefore, when no structure for stopping the rotation is provided, the amount of rattling of each of the toner cartridges 1*y* to 1*k* increases, and there is a risk that the developer will leak through the supply port 22*a* and the waste-toner receiving port 32. In particular, when each of the toner cartridges 1*y* to 1*k* is long in the up-down direction as in the exemplary embodiment, the distance from the receiving gear 37 is generally long, and adverse effects of the rotation tends to increase. In a case where the rotation is stopped at two locations, the amount of rattling caused by the driving force may be large when the positioning structures at the two locations are the same or when the farther positioning structure has a smaller spatial allowance.

In contrast, in each of the toner cartridges 1*y* to 1*k* according to the exemplary embodiment, a structure for stopping the rotation is provided at two locations, that is, a location of the rotation stopper projection 7*y* and the rotation stopping recess 51 and a location of the rotation stopper recess 8*y* and the rotation stopping projection 52. The rotation stopper projection 7*y* and the rotation stopping recess 51, which are closer to the receiving gear 37, have a smaller play.

In each of the toner cartridges 1*y* to 1*k* according to the exemplary embodiment, the rotation stopping projection 52 provided on the new-toner containing portion 11 has a projecting shape. When a portion for stopping the rotation provided on the new-toner containing portion 11 has a recessed shape, the portion for stopping the rotation is recessed into of the new-toner containing portion 11, and the capacity of the new-toner containing portion 11 is reduced. In contrast, in the exemplary embodiment, the rotation stopping projection 52 provided on the new-toner containing portion 11 has a projecting shape.

In addition, in the printer U according to the exemplary embodiment, each of the rotation stopper recesses 8*y* to 8*k* in the apparatus body U1 is formed in the shape of a long hole extending in the up-down direction.

In each of the toner cartridges 1*y* to 1*k* according to the exemplary embodiment, the rotation stopping recess 51 provided on the waste-toner containing portion 12 has a recessed shape. A frame of the manual feed tray TR1 is disposed near the rotation stopping recess 51 in the apparatus body U1, and the spatial allowance in the apparatus body U1 is small. Therefore, when a recess that is recessed into the apparatus body U1 is provided, the overall size of the printer U is increased as a result. In contrast, in the exemplary embodiment, the rotation stopping recess 51 is recessed into each of the toner cartridges 1_y_ to 1_k_.

Referring to FIG. 7B, in each of the toner cartridges 1_y_ to 1_k_ according to the exemplary embodiment, the receiving gear 37 is disposed in an outer region, that is, a front region, in the attachment/removal direction. Therefore, when each of the body gears 6_y_ to 6_k_ is rotated, the receiving gear 37 receives a reaction force f1 in the radial direction, and each of the toner cartridges 1_y_ to 1_k_ receives a rotational force in the direction of arrow Y1 in FIG. 7B. This rotational force Y1 may cause an adverse effect, such as leakage of toner. In the exemplary embodiment, the projecting length of the rotation stopper projection 7_y_, which is close to the receiving gear 37, is longer than the projecting length of the rotation stopping projection 52, which is distant from the receiving gear 37.

Modifications

While the exemplary embodiment of the present disclosure has been described in detail, the present disclosure is not limited to the above-described exemplary embodiment. Obviously, various alterations and modifications may be arrived at by those skilled in the art within the scope described in the claims, and it is to be understood that such alterations and modifications are naturally included in the technical scope of the present disclosure. Constituent elements of the above-described exemplary embodiment may be applied in any combination without departing from the spirit of the present disclosure.

Modifications (H01) to (H010) of the present disclosure will now be described.

(H01) Although the printer U is described as an example of an image forming apparatus in the above-described exemplary embodiment, the image forming apparatus is not limited to this. The image forming apparatus may be, for example, a copy machine, a facsimile machine, or a multifunction machine having some or all of these functions.

(H02) Although the receiving gear 37 is disposed at the lower end of each of the toner cartridges 1_y_ to 1_k_ in the above-described exemplary embodiment, the receiving gear 37 is not limited to this. The receiving gear 37 may be disposed at the upper end of each of the toner cartridges 1_y_ to 1_k_.

(H03) Although four image forming devices UY to UK are provided in the above-described exemplary embodiment, image forming devices for two, three, or five or more colors may be provided.

(H04) Although the gears 24, 27, and 34 to 37 are disposed on the front surface of each of the toner cartridges 1_y_ to 1_k_ in the attachment/removal direction in the above-described exemplary embodiment, the gears are not limited to this. The gears may be disposed on the back surface of each toner cartridge in the attachment/removal direction.

(H05) Although the outer covering 41 is provided in the above-described exemplary embodiment, the outer covering 41 may be omitted.

(H06) The positions of the transport auger 26 and the waste-toner receiving port 32 are not limited to those in the above-described exemplary embodiment, and may be changed in accordance with, for example, the design or specifications.

(H07) The combinations of the projections and the recesses for stopping the rotation are not limited to those in the above-described exemplary embodiment. For example, the rotation stopping portions on each of the toner cartridges 1_y_ to 1_k_ may both have a projecting shape or a recessed shape. Alternatively, the arrangement of the recesses and projections may be reversed from that in the above-described exemplary embodiment.

Figure 8A:
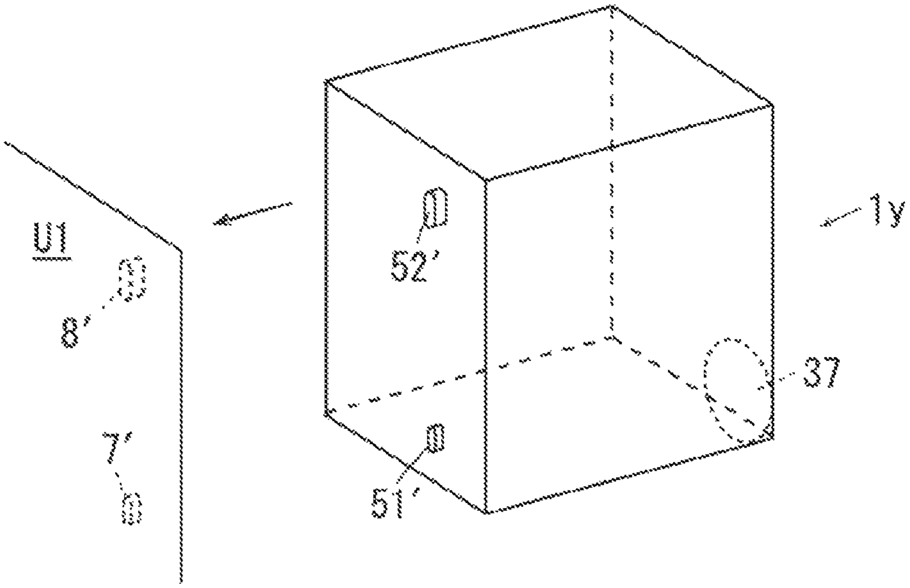
FIG. 8A illustrates modifications of rotation stopper portions and rotation stopping portions in which ribs and grooves are used.
Figure 8B:
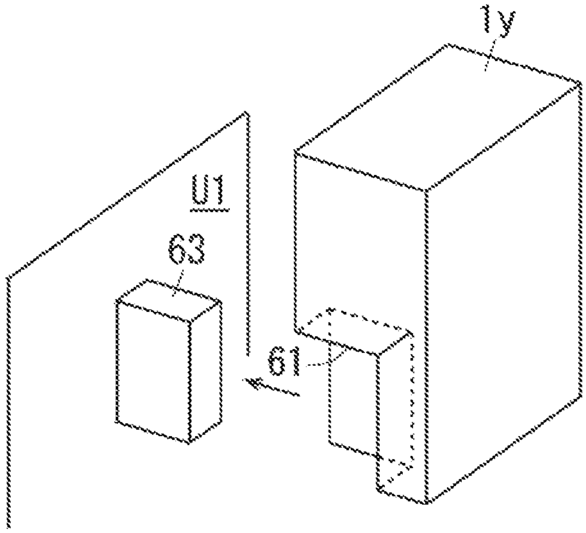
FIG. 8B illustrates modifications of a rotation stopper portion and a rotation stopping portion in which a cut and a block-shaped projection are used.
Figure 8C:
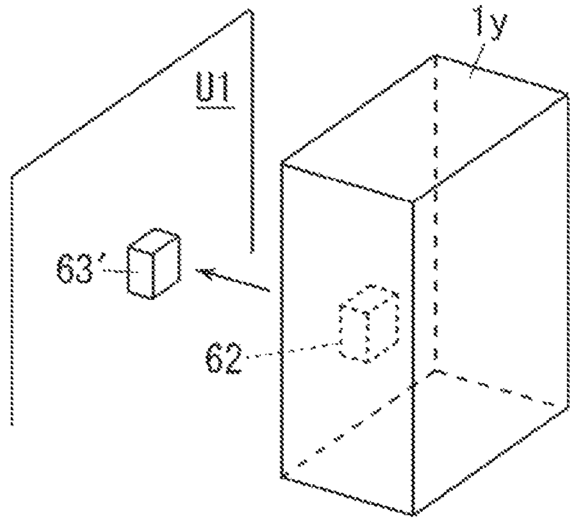
FIG. 8C illustrates modifications of a rotation stopper portion and a rotation stopping portion in which a recess and a projection are used.

FIGS. 8A, 8B, and 8C illustrate modifications of the rotation stopper portions and the rotation stopping portions, wherein FIG. 8A illustrates an example in which ribs and grooves are provided, FIG. 8B illustrates an example in which a cut and a block-shaped projection are provided, and FIG. 8C illustrates an example in which a recess and a projection are provided.

(H08) Although the rotation stopper portions and the rotation stopping portions are formed of projecting portions and hole-shaped portions in the above-described exemplary embodiment, the rotation stopper portions and the rotation stopping portions are not limited to this. For example, as illustrated in FIG. 8A, raised lines (ribs) extending in a longitudinal direction may be provided on each of the toner cartridges 1_y_ to 1_k_ while grooves to which the ribs may be fitted are provided in the apparatus body U1. Alternatively, the raised lines (ribs) may be provided on the apparatus body U1 while the grooves are provided in each of the toner cartridges 1_y_ to 1_k_. The ribs are fitted to the grooves to stop the rotation. As illustrated in FIGS. 8B and 8C, a cut portion 61 or a recess 62 may be provided on each of the toner cartridges 1_y_ to 1_k_. When each of the toner cartridges 1_y_ to 1_k_ is attached to the apparatus body U1, a block-shaped projection 63, 63' provided on the apparatus body U1 may come into contact with the cut portion 61 or the recess 62 to stop the rotation. In FIGS. 8B and 8C, the cut portion 61 or the recess 62 may be provided in the apparatus body U1 while the projection 63, 63' is provided on each of the toner cartridges 1_y_ to 1_k_.

(H09) The relationship between the lengths of the projections 7_y_ and 52 is not limited to that in the above-described exemplary embodiment. The relationship between the lengths of the projections 7_y_ and 52 may be reversed, or the projections 7_y_ and 52 may have the same length.

(H010) Although the new-toner containing portion 11 and the waste-toner containing portion 12 are provided in the above-described exemplary embodiment, the developer container is not limited to this. For example, the developer container may be a toner cartridge including only the new-toner containing portion 11 or a waste toner box including only the waste-toner containing portion 12.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A developer container comprising:

a containing unit that contains developer;

a transport unit that transports the developer; and a receiving unit that receives a driving force transmitted from a transmitting unit of a body of an image forming apparatus and transmits the driving force to the transport unit, wherein the developer container is removably attachable to the body of the image forming apparatus, wherein the developer container includes a first rotation stopping portion and a second rotation stopping portion, the first rotation stopping portion being one of a recess or a projection, and the second rotation stopping portion being another of the recess or the projection, wherein, when the developer container is attached to the body of the image forming apparatus, the first rotation stopping portion and the second rotation stopping portion are fitted to a first rotation stopper portion and a second rotation stopper portion, respectively, the first rotation stopper portion being the other of the recess or the projection, and the second rotation stopper portion being the one of the projection or the recess, and wherein a depth or a height of the first rotation stopping portion is less than a depth or a height of the second rotation stopping portion.

2. The developer container according to claim 1, wherein the containing unit includes:

a first containing portion containing new developer to be supplied to the body of the image forming apparatus; and a second containing portion containing developer discharged from the body of the image forming apparatus, and wherein the second rotation stopping portion and the first rotation stopping portion are provided on the first containing portion and the second containing portion, respectively.

3. The developer container according to claim 2, wherein an upper end of the first containing portion is disposed above an upper end of the second containing portion, and wherein the second rotation stopping portion has a projecting shape that projects outward beyond an outer surface of the first containing portion, and is fitted to the second rotation stopper portion having a recessed shape when the developer container is attached to the body of the image forming apparatus.

4. The developer container according to claim 3, wherein the second rotation stopper portion has a shape of a long hole having a minor axis in a circumferential direction of rotation of the receiving unit and a major axis in a radial direction of rotation of the receiving unit.

5. The developer container according claim 2, wherein the first rotation stopping portion has a recessed shape that is recessed inward beyond an outer surface of the containing unit, and wherein the first rotation stopper portion having a projecting shape is fitted to the first rotation stopping portion when the developer container is attached to the body of the image forming apparatus.

6. The developer container according to claim 5, wherein the containing unit includes:

a first containing portion containing new developer to be supplied to the body of the image forming apparatus; and a second containing portion containing developer discharged from the body of the image forming apparatus, and wherein the first rotation stopping portion having the recessed shape is recessed inward in the second containing portion.

7. The developer container according claim 1, wherein the first rotation stopping portion has a recessed shape that is recessed inward beyond an outer surface of the containing unit, and wherein the first rotation stopper portion having a projecting shape is fitted to the first rotation stopping portion when the developer container is attached to the body of the image forming apparatus.

8. The developer container according to claim 7, wherein the containing unit includes:

a first containing portion containing new developer to be supplied to the body of the image forming apparatus; and a second containing portion containing developer discharged from the body of the image forming apparatus, and wherein the first rotation stopping portion having the recessed shape is recessed inward in the second containing portion.

9. A developer container comprising:

a containing unit that contains developer;

a transport unit that transports the developer; and a receiving unit that receives a driving force transmitted from a transmitting unit of a body of an image forming apparatus and transmits the driving force to the transport unit, wherein the developer container is removably attachable to the body of the image forming apparatus, wherein the developer container includes a first rotation stopping portion and a second rotation stopping portion that is farther from the receiving unit than the first rotation stopping portion, wherein, when the developer container is attached to the body of the image forming apparatus, the first rotation stopping portion comes into contact with a first rotation stopper portion provided on the body of the image forming apparatus, and the second rotation stopping portion comes into contact with a second rotation stopper portion provided on the body of the image forming apparatus, and wherein a spatial allowance between the first rotation stopping portion and the first rotation stopper portion is less than a spatial allowance between the second rotation stopping portion and the second rotation stopper portion.

10. The developer container according to claim 9, wherein the containing unit includes:

a first containing portion containing new developer to be supplied to the body of the image forming apparatus; and a second containing portion containing developer discharged from the body of the image forming apparatus, and wherein the second rotation stopping portion and the first rotation stopping portion are provided on the first containing portion and the second containing portion, respectively.

11. The developer container according to claim 10, wherein an upper end of the first containing portion is disposed above an upper end of the second containing portion, and wherein the second rotation stopping portion has a projecting shape that projects outward beyond an outer surface of the first containing portion, and is fitted to the second rotation stopper portion having a recessed shape when the developer container is attached to the body of the image forming apparatus.

12. The developer container according to claim 11, wherein the second rotation stopper portion has a shape of a long hole having a minor axis in a circumferential direction of rotation of the receiving unit and a major axis in a radial direction of rotation of the receiving unit.

13. The developer container according claim 11, wherein the first rotation stopping portion has a recessed shape that is recessed inward beyond an outer surface of the containing unit, and wherein the first rotation stopper portion having a projecting shape is fitted to the first rotation stopping portion when the developer container is attached to the body of the image forming apparatus.

14. The developer container according claim 10, wherein the first rotation stopping portion has a recessed shape that is recessed inward beyond an outer surface of the containing unit, and wherein the first rotation stopper portion having a projecting shape is fitted to the first rotation stopping portion when the developer container is attached to the body of the image forming apparatus.

15. The developer container according to claim 14, wherein the containing unit includes:

a first containing portion containing new developer to be supplied to the body of the image forming apparatus; and a second containing portion containing developer discharged from the body of the image forming apparatus, and wherein the first rotation stopping portion having the recessed shape is recessed inward in the second containing portion.

16. The developer container according claim 9, wherein the first rotation stopping portion has a recessed shape that is recessed inward beyond an outer surface of the containing unit, and wherein the first rotation stopper portion having a projecting shape is fitted to the first rotation stopping portion when the developer container is attached to the body of the image forming apparatus.

17. The developer container according to claim 16, wherein the containing unit includes:

a first containing portion containing new developer to be supplied to the body of the image forming apparatus; and a second containing portion containing developer discharged from the body of the image forming apparatus, and wherein the first rotation stopping portion having the recessed shape is recessed inward in the second containing portion.

18. The developer container according to claim 16, wherein a length of the second rotation stopping portion is shorter than a length of the first rotation stopping portion in a direction in which the developer container is attached to and removed from the body of the image forming apparatus.

19. The developer container according to claim 9, wherein the receiving unit is disposed at an outer end of the containing unit in a longitudinal direction of the containing unit.

20. An image forming apparatus comprising:

an image carrier;

a developing unit that develops a latent image carried by the image carrier;

a transfer unit that transfers a developed image from the image carrier to a medium; and the developer container according to claim 9 that contains new developer to be supplied to the developing unit, the developer container being removably attachable to a body of the image forming apparatus.

* * * * *